(No Model.)
T. B. SLOPER.
WHEEL TIRE.
No. 532,189. Patented Jan. 8, 1895.
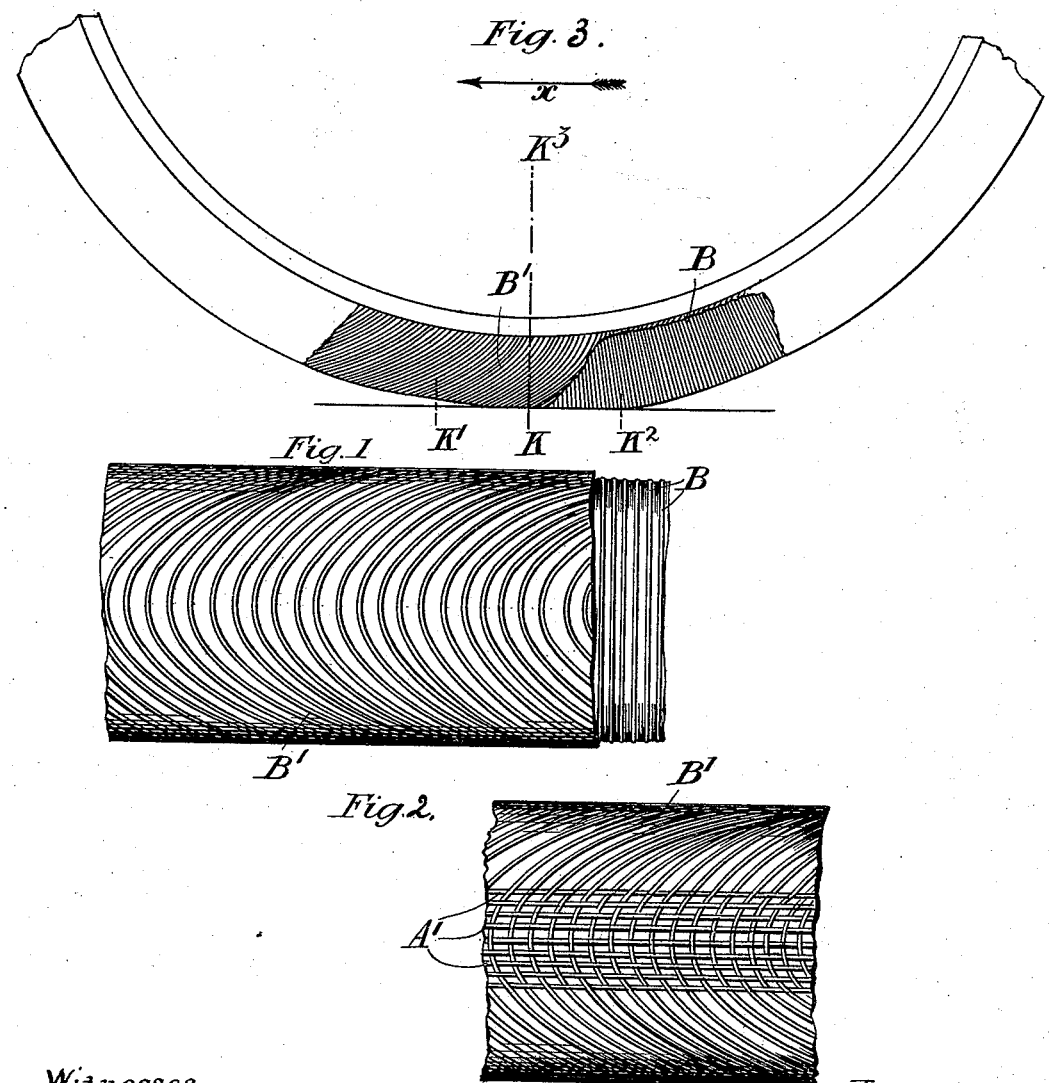
Witnesses
Thomas Durant
Wallace Murdock
Inventor:
Thomas B. Sloper,
by Church & Church
his Attys.

UNITED STATES PATENT OFFICE.

THOMAS BEAVAN SLOPER, OF DEVIZES, ENGLAND.

WHEEL-TIRE.

SPECIFICATION forming part of Letters Patent No. 532,189, dated January 8, 1895.

Application filed June 7, 1894. Serial No. 513,786. (No model.)

*To all whom it may concern:*

Be it known that I, THOMAS BEAVAN SLOPER, a subject of the Queen of England, residing at Devizes, England, have invented certain new and useful Improvements in or Relating to Wheel-Tires, of which the following is a specification.

When a pneumatic tired wheel is at rest, bearing the weight of a rider, the pressure against the ground flattens the lower part of the tire, at the same time causing the sides to expand or bulge outward. In addition to this side expansion, the reduction in the circumference of the wheel at the flattened part, causes an excess of material at the lower part of the tire, which forms a ridge or wave in the outer circumference of the tire just where the latter makes contact with the ground both before and behind the wheel.
When the wheel is at rest, with tires of ordinary construction, these waves are of equal size in front and behind, but when driving power is applied to the wheel the wave in front increases in size, and the wave behind is reduced, in consequence of the elasticity or "draw" of the tire. The wave in front offers very considerable resistance when the wheel is running, and one of the objects of my invention is to prevent this resisting wave from forming in front of the wheel, and to cause the excess of material due to the flattening of the tire to increase the size of the wave or the bearing surface of the tire behind the wheel and thereby tend to urge the wheel forward. In order to effect this result I take advantage of the lateral expansion or "side bulging" of the tire, just over the surface in actual contact with the road, by causing this lateral expansion to put strain on special diagonal threads, or loops of fibrous material, arranged slanting downward and forward, from the outside of the wheel rim to the running surface, the loops extending from one flange or edge of the rim, around the tire to the other edge of the rim. These diagonal threads or loops, being non-extensible, they not only prevent a resisting wave from forming in front of the wheel but they have a tendency when strain is put upon them to reduce the diameter of the tire just where the latter first comes in contact with the ground, thus further reducing the resistance in front of the wheel. As the excess of material caused by the flattening of the tire is thus prevented from forming a wave in front of the wheel, the peculiar arrangement of the diagonal threads transfers as it were, said excess of material to the back of the wheel thereby considerably increasing the bearing surface of the tire at that part which has a forwarding effect on the wheel.

Another important advantage in my arrangement is, that the driving power is applied direct from the wheel rim to the road surface the "draw" or "give" of the ordinary pneumatic tire when power is applied to drive it being prevented by the diagonal threads or loops. This in itself is a considerable saving of power.

In the accompanying drawings Figure 1 is a diagrammatic view showing portion of the outside or running surface of the finished tire or tire cover and the arrangement of the "transverse" and inclined weft threads therein. Fig. 2 is a similar view showing fibrous warp threads introduced at the tread portion. Fig. 3 is a side elevation of portion of the tire applied to the wheel rim and illustrating the action of the tire when subjected to pressure. The arrow $x$ indicates the direction in which the wheel travels.

Like letters of reference in the several figures indicate the same parts.

Referring particularly to Fig. 3, B' represents the threads of inelastic material, going to make up the tire, arranged slanting downward and forward toward the front of the wheel. These threads or loops extend from one edge of the wheel rims around the tire to the other edge of the rim.

B represents the transverse threads arranged perpendicularly to the selvage of the tire. In addition to these threads, further threads of fibrous material may be introduced if desired at the thread portion of the tire as shown at A' in Fig. 2.

The action may be described as follows: When weight is applied to the wheel, the tire will bulge out at the sides just over the surface in actual contact with the ground. This side bulging will throw a strain on the diagonal thread B, which being inelastic cannot give, and the result is that there will be a reduction in the amount of surface of the tire pressing on the ground at K K' and no resisting wave will be formed in front of the wheel, while in the rear of the contact point there will be an increase of the surface pressure represented at K K².

The before described transverse threads B prevent any actual increase in the sectional area of the tire itself but the reduction of the bearing surface at K K' in front of K K³ puts extra weight on the surface at K K² thus causing the bearing surface where the wheel touches the ground to be farther back than usual.

In applying my invention to cushion or large solid tires I use only the diagonal or slanting weft threads B' (without the transverse threads B) and arrange them near the outer surface of the tire.

The flattening of soft cushioned tires under pressure such as that due to the weight of a cyclist is very marked. By tying back the rubber by diagonal loops such as B' and thus preventing a wave from forming in front of the part in contact with the ground, the excess of rubber, as in the preceding example is obliged to form a wave behind the wheel and thus tends to urge the wheel onward.

The foregoing arrangement may be modified without departing from the spirit of the invention. For example, the before described inclined threads B' may if desired be arranged inside of the straight or transverse ones B and any number of layers may be employed and the fabric may be woven with fibrous warp and india rubber weft threads or either or both the warp and weft may be partly of fibrous and partly of india rubber threads.

I claim—

1. A wheel tire having threads incorporated therein and slanting from the ground or tread surface backward and upward to the rim on both sides of the tire substantially as described.

2. A wheel tire reinforced by a winding of fibrous thread approximately at right angles to the tube and by threads slanting downward and forward from the bottom of the rim to the running surface on each side of the tire.

3. A wheel tire in which diagonal threads are arranged slanting forward from the bottom of the rim to the running surface (and without threads slanting downward and backward) in such a manner that the lateral expansion or flattening of the tire immediately under the wheel base puts extra strain on the said diagonal threads and thus prevents a resisting wave from forming in front of the wheel when running.

4. A wheel tire having inelastic threads slanting from the rim downward and forward across the tread and back to the rim on the opposite side, whereby the bulging of or flattening of the tire under the wheel will cause a lifting of the tire in front of the contact point, as and for the purpose set forth.

5. A wheel tire constructed with loops of thread slanting downward and forward from the bottom of the wheel rim such threads leaving the rim on both sides of the tire in about the same part of the circumference of the wheel and passing over the tread of the tire at a position in advance of the point where they leave the rim.

6. A wheel tire reinforced by a winding or fibrous thread approximately at right angles to the plane of the wheel in combination with diagonal threads slanting downward and forward on each side of the tire from the rim to the tread surface at the ground.

7. A wheel tire reinforced by fibrous threads approximately at right angles to the plane of the wheel in combination with diagonal threads slanting downward and forward on each side of the tire from the lower part of the rim to the tread surface and with longitudinal threads encircling the tread surface.

8. The combination with a solid or hollow cycle tire of diagonal threads incorporated therein slanting from the bottom of the wheel rim downward and forward only on both sides of the tire without any similar threads slanting downward and backward.

9. A tire having loops of thread incorporated therein and slanting downward and forward from both sides of the lower part of the wheel rim and passing over the tread of the tire at a position in advance of the point of leaving the rim.

In testimony whereof I have hereto set my hand in the presence of the two subscribing witnesses.

THOMAS BEAVAN SLOPER.

Witnesses:
 ALFRED J. BOULT,
 HARRY B. BRIDGE.